United States Patent
Tailliet

(10) Patent No.: US 6,848,049 B1
(45) Date of Patent: Jan. 25, 2005

(54) METHOD AND APPARATUS FOR THE AUTHENTICATION OF INTEGRATED CIRCUITS

(75) Inventor: Francois Tailliet, Epinay sur Seine (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/095,532

(22) Filed: Jun. 10, 1998

(30) Foreign Application Priority Data

Jun. 10, 1997 (FR) .......................................... 97 01790

(51) Int. Cl.[7] .............................................. H04L 9/00
(52) U.S. Cl. ...................... 713/168; 713/200; 713/172; 380/202; 380/201; 705/58; 705/57; 705/29; 705/28; 714/737; 714/724; 714/37; 714/32; 714/30; 714/25
(58) Field of Search .......................... 713/172, 2, 200, 713/168; 705/58, 57, 28, 29; 380/202, 201; 714/25, 30, 32, 37, 724, 737

(56) References Cited

U.S. PATENT DOCUMENTS

| | | | | |
|---|---|---|---|---|
| 3,829,661 A | * | 8/1974 | Silverman et al. | 235/61.7 |
| 3,934,122 A | * | 1/1976 | Riccitelli | 235/61.7 |
| 4,710,613 A | * | 12/1987 | Shigenaga | 235/380 |
| 4,816,656 A | * | 3/1989 | Nakano et al. | 235/380 |
| 4,882,474 A | * | 11/1989 | Anderl et al. | 235/380 |
| 5,288,979 A | * | 2/1994 | Kreft | 235/380 |
| 5,765,197 A | * | 6/1998 | Combs | 711/164 |
| 5,818,738 A | * | 10/1998 | Effing | 364/579 |
| 5,892,211 A | * | 4/1999 | Davis et al. | 235/380 |
| 6,055,638 A | * | 4/2000 | Pascal et al. | 713/201 |

FOREIGN PATENT DOCUMENTS

| | | | | |
|---|---|---|---|---|
| EP | 0186038 | 7/1986 | | |
| EP | 0313967 | 5/1989 | | |
| EP | 321728 | * 6/1989 | | G07F/7/10 |
| EP | 0602643 | 6/1994 | | |
| EP | 602643 | * 6/1994 | | G06K/19/07 |
| FR | 2640061 | * 6/1990 | | G06K/19/00 |

* cited by examiner

Primary Examiner—Andrew Caldwell
Assistant Examiner—Paul Callahan
(74) Attorney, Agent, or Firm—Lisa K. Jorgenson; Stephen Bongini; Fleit,Kain,Gibbons,Gutman,Bongini & Bianco P.L.

(57) ABSTRACT

A method for the authentication of an integrated circuit in an application system comprises, for the integrated circuit: detecting an activation scenario, and then modifying at least one of its responses. The application system implements an application program which sends instructions to the integrated circuit. The activation scenario is contained in the sequence of instructions received from the application program. The modification causes no malfunction of the integrated circuit in the application system, and therefore does not put the integrated circuit out of operation. A complementary method for the application system comprises: detecting an activation scenario; measuring the response of the integrated circuit to the activation scenario; verifying the response if it has been modified correctly by the integrated circuit; and authenticating the integrated circuit if the response is verified.

20 Claims, 3 Drawing Sheets

METHOD AND APPARATUS FOR THE AUTHENTICATION OF INTEGRATED CIRCUITS

CROSS-REFERENCE TO RELATED APPLICATIONS

This application is based upon and claims the benefit of the priority of the prior French patent application 97 07 190 filed on Jun. 10, 1997, the contents of which are incorporated herein.

BACKGROUND OF THE INVENTION

1. Field of the Invention

The invention relates generally to integrated circuits and more particularly to a method and apparatus for the authentication of integrated circuits.

There is a known method of using registers to contain an internal signature of an integrated circuit, in the form of a binary word. This internal signature is used in certain cases to identify the type or the origin of the product, to enable appropriate use in terms of access time and duration of the pulse for writing data elements in the memory. In other cases, the circuit has to be authenticated in its application. Such cases relate, in particular, to chip card type products and products derived therefrom. The internal signature then consists of information of the serial number and key type, to be used by a cryptography algorithm capable of giving an authentication certificate. If the card is not authenticated by the application system (the card reader), it is rejected. What has to be done here is to combat the falsification of cards and act against fraudulent access to confidential information contained in these cards.

2. Description of the Related Art

The authentication procedure is an integral part of the exchange protocol between the card and the application system (the reader), the securing of the authentication system being obtained by the choice of the cryptography algorithm and by the fact that the confidential data elements are not output from the card. These data elements are furthermore concealed in the card by address mixing, data encoding (permutation) or other means.

Between the simple identification and the highly secured authentication of circuits, an intermediate need has been discovered. This is the need to authenticate circuits in order to prevent the dissemination of copies of circuits. These circuits relate to current applications and not necessarily to so-called secured applications. In these applications, it is sought to identify the origin of these circuits with certainty, i.e., to authenticate them.

This need is emerging especially as a result of the large-scale miniaturization of the integrated circuits, which prevent the external marking of the packages, and also as a result of technological advances which, despite the major efforts made by integrated circuit manufacturers to find technical ways to prevent the copying of integrated circuits, can be used with varying degrees of difficulty to copy these very same circuits or at least certain circuits. All these aspects are exacerbated by the increasingly common use of integrated circuits in all fields, owing to their miniaturization, low power consumption, low cost, etc.

SUMMARY OF THE INVENTION

Briefly, according to one aspect of the invention, a method for the authentication of an integrated circuit in an application system comprises, for the integrated circuit: detecting an activation scenario, and then modifying at least one of its responses. The application system implements an application program which sends instructions to the integrated circuit. The activation scenario is contained in the sequence of instructions received from the application program. The modification causes no malfunction of the integrated circuit in the application system.

Briefly, according to another aspect of the invention, a method for the authentication of an integrated circuit in an application system comprises, for the application system: detecting an activation scenario; measuring the response of the integrated circuit to the activation scenario; verifying the response if it has been modified correctly by the integrated circuit; and authenticating the integrated circuit if the response is verified. The application system implements an application program which sends instructions to the integrated circuit. The activation scenario is contained in the sequence of instructions sent by the application program.

Briefly, in accordance with other aspects of the invention, there are provided computer readable media comprising program instructions for implementing the above methods.

Briefly, in accordance with other aspects of the invention, there are provided authentication systems for implementing the above methods.

BRIEF DESCRIPTION OF THE DRAWINGS

The invention is presented in greater detail in the following description, given by way of an indication that in no way restricts the scope of the invention, in an exemplary application of the method of authentication to a memory-based integrated circuit illustrated in the appended drawings, of which.

DETAILED DESCRIPTION OF AN EMBODIMENT

1. Overview

In the invention, it has been sought to obtain a method of authentication that does not fall within the framework of a particular procedure as in the case of cryptography. In this way, the authentication is done in a manner transparent to an external observer. This makes for a method that is more simple while at the same time being very sure.

The solution found to this technical problem consists of the use of the normal instructions of the integrated circuit used in the application program to activate a (temporary) modification of at least one response of the integrated circuit, upon the detection of a scenario of activation in the sequence of the instructions received by the integrated circuit, the modification of the response causing no malfunction of the integrated circuit.

According to one aspect of the invention, these modifications are made on the executing path of one or several instructions of the integrated circuit.

In one example, a scenario may consist of eight instructions for reading and three instructions for writing in the memory of the integrated circuit at any address whatsoever, and the modification may consist in reversing the bit of the data element read for the next read instruction. The application system knows the scenario. It is capable of detecting it and ascertaining that the modification has truly taken place. In the example, it is enough to redo the reading and compare the two data elements read.

A user who is unaware of this feature does not realize anything.

If the application system notes that there is no modification of behavior whatsoever, it does not authenticate the circuit. Preferably, to prevent any cause-and-effect relationship, it generates an alarm at the end of a certain period of time after the detection of an anomaly, for example after 20 read cycles.

According to one aspect of the invention, modification means of a response are placed on the executing path of at least one instruction of the integrated circuit.

The modification of a response of the integrated circuit may be of any kind, provided that it does not put the integrated circuit out of operation in its application and provided that it can be measured by the application system. It may be a modification of a response time with respect to a particular instruction, a response time with respect to an exchanged data element or the like. The means of modification used in the integrated circuit may be RC type delay circuits or other delay circuits, flip-flop circuits, clock frequency dividers or data permutation circuits without this being an exhaustive list.

The detection means may include counters, to count the number of instruction cycles (read, write cycles), combinational circuits for example to detect a particular combination of bits of an address.

All the circuits that can be used to implement the method of authentication according to the invention are well known to those skilled in the art.

2. Description

Figure 1:
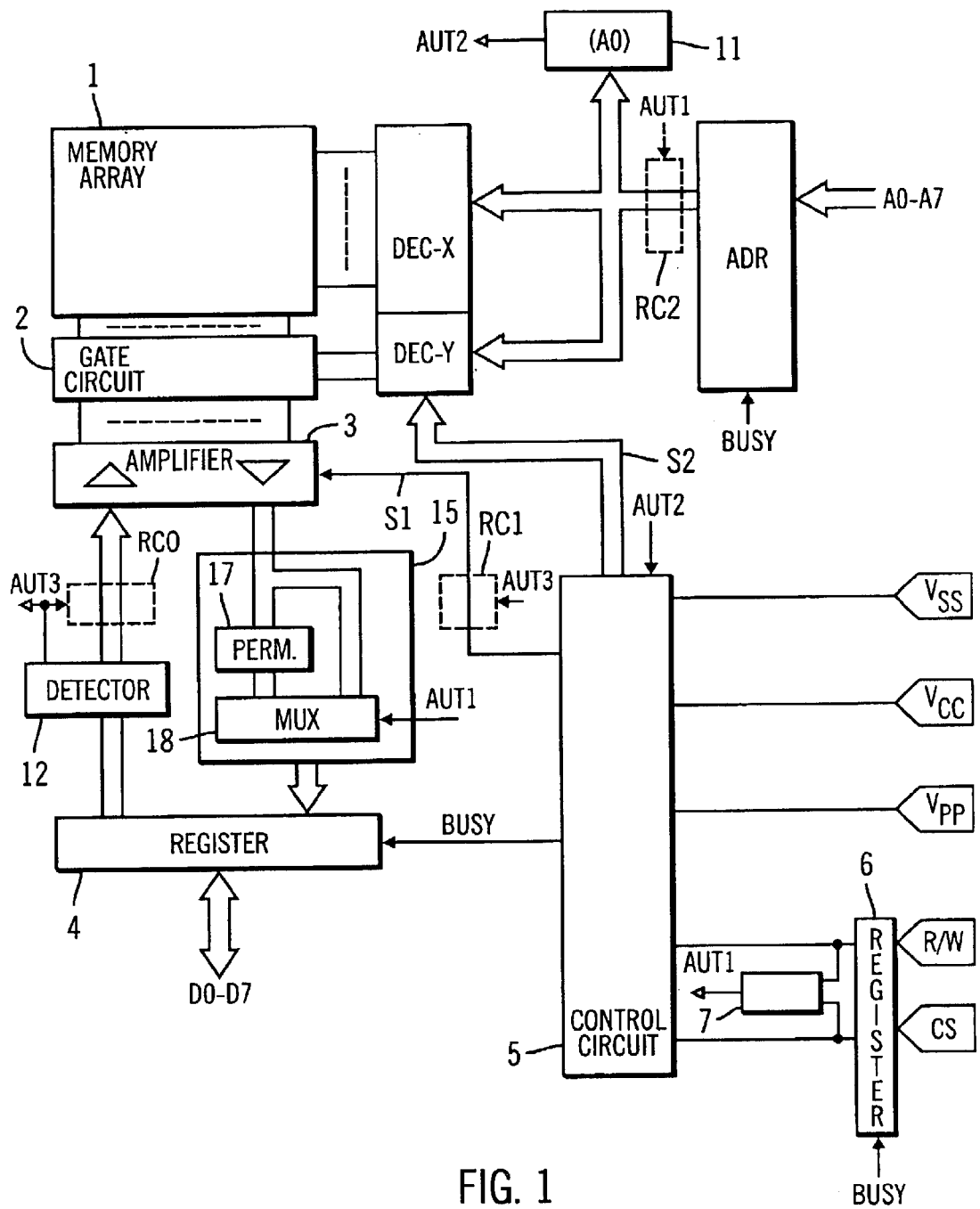
FIG. 1 shows a parallel-access memory in integrated circuit form comprising means to implement the method of authentication according to the invention.

FIG. 1 shows a memory in integrated circuit form to which the method of authentication according to the invention can be applied. In the example, this is an electrically programmable memory of the EPROM, EEPROM, flash EPROM or parallel access type. However, the invention can be applied to all types of integrated circuit and to all types of memory (RAM or others). The external interface includes logic supply terminals Vcc and Vss, one high voltage terminal Vpp for the programming and different terminals to receive control signals, including one package selection signal CS and one read/write signal R/W. The external interface also includes address input terminals A0–A7 and data input/output terminals D0–D7.

The integrated circuit includes a memory array 1 organized in bit lines and word lines to which access is obtained by means of address decoders. There is thus, a row (or word line) decoder DEC-X and a column (or bit line) decoder DEC-Y. The column decoder controls a gate circuit 2 which transmits the data elements to be written or the data elements that are read. It transmits these data elements from or to a read/write amplifier circuit 3 which is connected to a three-state two-way register 4 of the external interface for the input/output of the data elements D0–D7. The decoders DEC-X and DEC-Y select the bit lines and the word line corresponding to the address that is presented to them by an address register ADR which receives the address signals A0–A7 from the external interface. The register ADR is of the three-state one-way type.

Finally, a control circuit 5 is provided. This control circuit receives the different control signals R/W, CS and the supplies Vcc, Vss and Vpp to sequence the different elements of the integrated circuit and give (S2) the appropriate voltage levels to be applied to the bit lines and the word lines of the memory array, as a function of the control signals received.

Apart from the supplies needed for the operational functioning of the integrated circuit, the other control signals R/W and CS, address signals A0–A7 and data input/output signals D0–D7 are connected in the integrated circuit to one-way or two-way three-state registers. There is thus a register 6 for the control signals R/W and CS, the register ADR for the address signals A0–A7 and the two-way register 4 for the data signals D0–D7.

As soon as a new instruction is taken into account by the control circuit 5 of the integrated circuit, it places these registers in a state of high impedance on the external interface side to prevent any new instruction from being taken into account so long as the current instruction is not terminated. For this purpose, it activates a signal, referenced BUSY, for setting up a state of high impedance. As soon as the instruction is terminated, the control circuit 5 deactivates this signal. Should the current instruction be a read instruction, the data element read is transmitted at output of the data input/output register 4 to the external interface D0–D7.

The working of a memory in integrated circuit form such as this is well known and shall therefore not be described in greater detail.

In the method of circuit identification according to the invention, it is provided that a pre-set scenario of activation obtained from the running of an application program for the use of the integrated circuit will activate a modification of at least one response of said circuit. This modification appears intermittently, in a manner perceived by the external observer as being apparently random, whenever the scenario of activation may be detected by the integrated circuit.

The integrated circuit therefore comprises means for the detection of at least one scenario of activation.

Figure 2:
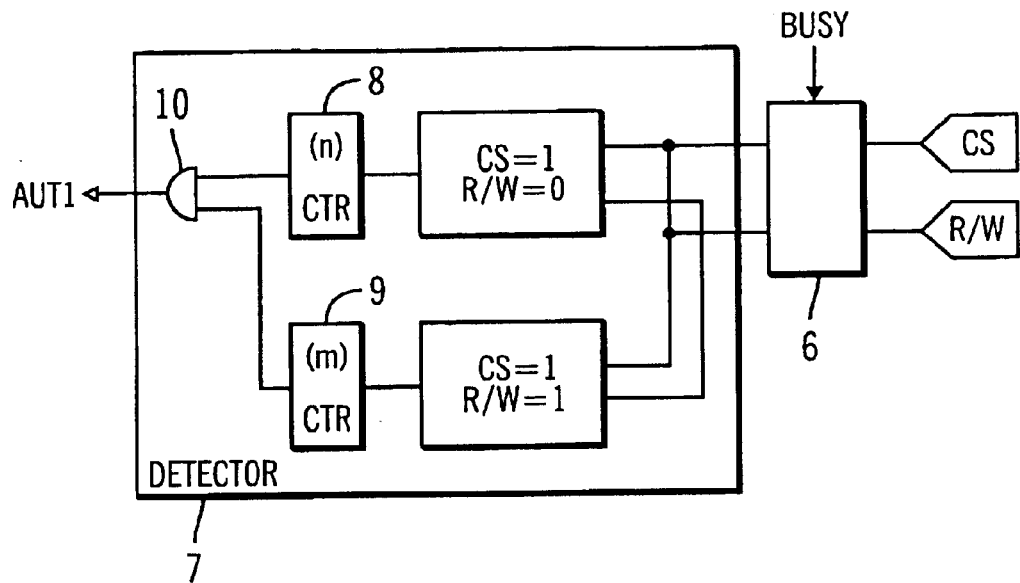
FIG. 2 shows a schematic view of an exemplary circuit for the detection of a scenario of activation.

If this scenario consists of a specified number of read commands or write commands, these detection means placed behind the register in FIG. 1 will comprise, in one example shown schematically in FIG. 2, a first counter 8 of a number n to count the read instructions (CS=1, R/W=0) and a second counter 9 of a number m to count the write instructions (CS=1, R/W=1), the outputs of the two counters being combined in a combinational circuit 10 to give a first signal AUT1 for the activation of authentication.

Another possible scenario may consist of a particular combination of bits of an address to which the current instruction relates. The detection means may then include combinational means 11 placed at output of the address register ADR. In a particular simple example, the scenario of activation consists of the presence of an odd-parity address. An activation signal AUT2 is then simply given by the address bit A0, as shown in FIG. 1.

It is quite possible to use similar means of detection 12 at input of the data register 4 to detect a particular combination of the data bits applied at input and deliver a corresponding detection signal AUT3.

Other scenarios are possible. The method of authentication may use one or more scenarios that are combined to give a single activation signal or to give different activation signals, with different means of modification, depending on the degree of reliability and complexity desired. Flip-flop circuits may be used to memorize the occurrence of different scenarios, to combine different scenarios with one another, according to an order of appearance which may or may not be determined, it being necessary then to provide for means to reset the flip-flop circuits.

In the example shown, there are three means of detection respectively, each giving an activation signal AUT1, AUT2 and AUT3.

These activation signals activate means for the modification of at least one response of the integrated circuit. According to one aspect of the invention, these means for the modification are placed on the executing path of one or several instructions of the integrated circuit.

Figure 3:
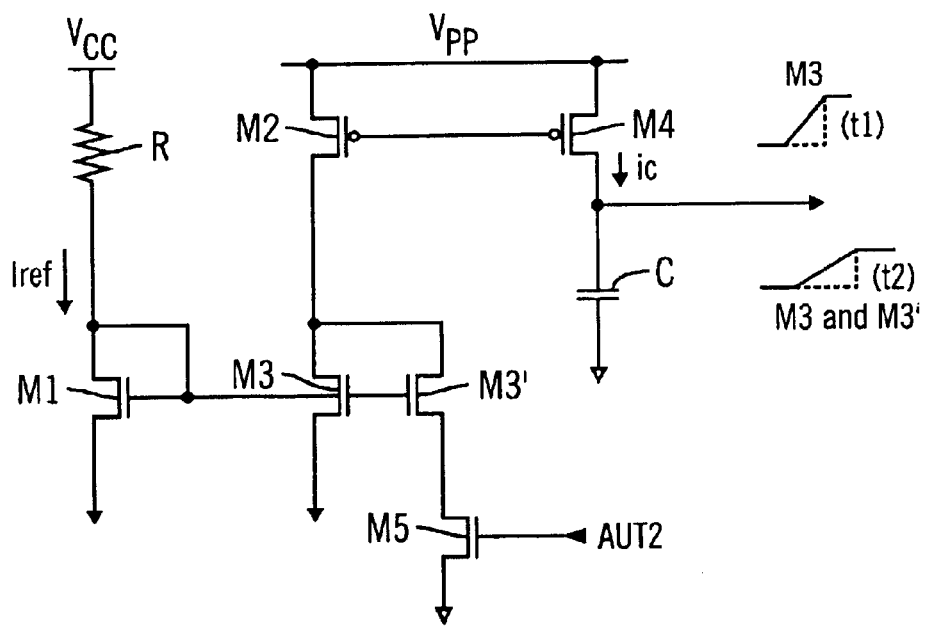
FIG. 3 shows an exemplary circuit for the modification of a response of the memory of FIG. 1.

In a first example shown in FIG. 3, these means for the modification of a response include a circuit capable of modifying the build-up time of the programming voltage ramp, in the case of an application to an EEPROM.

A programming voltage ramp generation circuit commonly includes a reference current generator Iref capable of giving a charging current Ic to a capacitor C, a terminal of which delivers the desired voltage ramp. By bringing about the application of an additional charging current, the ramp build-up time is modified in being either diminished or increased.

A practical embodiment comprises, for example, a current generator Iref with a load R supplied at a voltage Vcc series-connected with a transistor M1 connected to the ground and having its gate connected to its drain. A circuit for the charging of a capacitor C includes a first arm with two transistors M2 and M3 series-connected between the high programming voltage Vpp and the ground. The gate of the transistor M3 is controlled by the gate of the transistor M1, so that the transistor M3 conducts a current equal to K*Iref, by current mirror effect, where K is the ratio of the geometries between the transistors M3 and M1.

The charging circuit includes a second arm comprising a transistor M4 series-connected with the capacitor C, between the high programming voltage Vpp and the ground. The transistor M4 is controlled by the transistor M3 by current mirror effect (with the gate and drain of the transistor M2 connected) to conduct the current K*Iref (according to the ratio between the geometries of the transistors M3 and M4). The capacitor gets charged gradually to Vpp at this current K*Iref. The level Vpp is reached at the end of a time t1.

In the invention, there is provided another transmitter M3' parallel-connected with the transistor M3 of the first arm to achieve the conduction, by current mirror effect with the transistor M1, of a current K'*Iref. This transistor M3' is activated by being connected to the ground by means of a selection transistor M5 whose gate is controlled by an activation signal, in the example the signal AUT2.

When the transistor M5 is activated, the transistor M3' causes an increase in the charging current of the capacitor conducted by the transistor M4, which becomes equal to K*Iref+K'*Iref. The voltage ramp build-up time t2 becomes shorter (t2<t1). The programming is faster. This can easily be measured by the application system, since the integrated circuit could take account of a new instruction far more rapidly (With a shorter response time and the signal BUSY being deactivated more rapidly). For example, if the build-up time of the ramp is in the range of 1.5 milliseconds in operational mode and if the range of acceptable values for this characteristic is 1 to 2 milliseconds, the means of modification are calibrated so that the modified build-up time is of the order of one millisecond.

In the example, this modification circuit is activated on the detection of an odd-parity address, by the signal AUT2 (A0=1). In this case, the modification will be effective only if the current instruction is a programming instruction. Otherwise it has no effect. This amounts to saying that the scenario of activation comprises two detection operations that are combined sequentially. It could be planned to activate the modification by the combined detection of a write operation (R/W=1) and an odd parity address (AO=1).

Another circuit for the modification of the response of the integrated circuit may consist of a circuit for the modification of a data element. In one example, there is provided a data permutation and multiplexing circuit 15 before the data output register 4.

The data at output of the memory is applied to the input of the permutation circuit 17 and to an input of the multiplexer 18. The other input of the multiplexer receives the output of the permutation circuit. The output of the multiplexer is applied to the data output register. The input selected by default in the multiplexer is the output of the memory. The other input is selected only upon the activation of an activation signal, corresponding to the detection of a pre-set scenario. In the example, the modification means 15, 17 are activated by the signal AUT1. The application system is aware of the permutation and is therefore capable of "measuring" the modification of the response. In the example shown, the modification takes place only if the current instruction relates to a read instruction. If not, nothing happens. Everything works together in this way to make the modification a random modification and therefore to make the authentication method transparent to a user.

Instead of a permutation circuit 17, it is possible to provide for a circuit to delay the output of the data element at the external data input/output pins. The measurement of the modification will then consist, for the application system, in measuring the response time, namely the time at the end of which the data element is available at the external data input/output bus.

In another example shown in dashes in FIG. 1, a delay circuit RC0 may be placed between the output of the detection circuit 12 and the input of the read/write amplification circuit activated, for example, by the activation signal AUT3 to lay down a delay in the taking into account, by the current instruction, of the data element presented by the external data bus when a corresponding scenario of activation is detected. A delay circuit RC0 must be understood to comprise a delay circuit proper, of the RC or other type, and a multiplexer that enables the selection of the normal path without delay or that of the modified path with delay.

It is also possible to place a delay circuit RC1 on the path of the command S1 for the activation of the read/write amplifier circuit 3, activated by the activation signal AUT3, or a delay circuit RC2 at output of the address register ADR, controlled by the activation signal AUT1.

In the case of a serial access circuit, a valuable signal to be used will be the clock signal. This signal could be used for the detection scenario or for the modification according to the invention.

Figure 4:
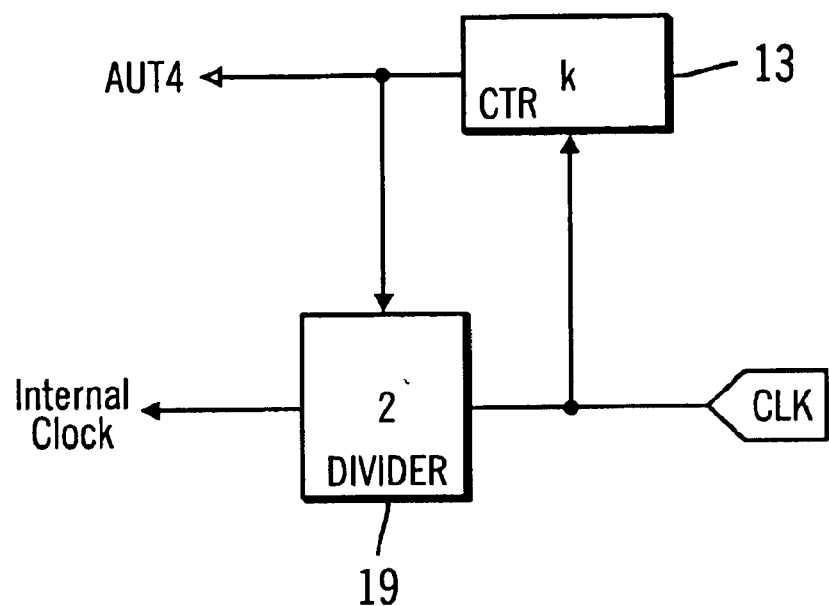
FIG. 4 shows a detection and modification device based on a clock signal, for an exemplary application of the invention to a serial access integrated circuit.

In one example shown in FIG. 4, the scenario using the clock signal consists of the detection of k clock cycles. The detection means will then comprise a counter 13 of the k clock cycles for the delivery, at output, of a detection signal AUT4. This detection may be used alone or combined with other elements to activate a modification according to the invention.

One modification according to the invention may consist in obtaining a variation in the clock frequency of the integrated circuit within a range of permitted values.

It is then possible to provide for a divider 19 of the clock frequency, for example a divider by 2, to slow the circuit down during a few clock cycles as shown in FIG. 4. In this case, it would be necessary to provide for a suitable circuitry to pass without difficulty from one frequency to the other. In the example, the divider is activated by the activation signal AUT4. Of course, other activation signals could be used. The list given is clearly a non-exhaustive list of exemplary modes of implementation of the method of authentication according to the invention. A delay circuit of this kind may be formed by a simple RC circuit or by logic gates, and may be applied to different internal elements of the circuit on a path of an instruction of the integrated circuit, to produce a measurable modification of the response time. It is sized so that the modification is in the range of acceptable values for the response time concerned.

The exemplary modes of implementation of the method of authentication according to the invention are not exhaustive. It will be understood that many possibilities are offered. These possibilities depend on the degree of reliability and the transparency desired, and also depend on the circuit to which the method is applied.

Depending on whether or not the circuit comprises a microprocessor, whether it has a serial access memory or a parallel access memory, and depending on the signals of the external interface and whether or not a clock signal is present, numerous variants may be used. In particular, in the case of a serial access memory, the application system could use the acknowledgment of receipt signal or the busy circuit signal generally designed to measure the response time.

The different circuits used must only enable an apparently random triggering of a modification of a response of the integrated circuit, and the modification should not put the circuit out of operation, i.e., it should be possible to ignore the modification either because it pertains to a data element modified in a way known by the application system or because it relates to a data element modified in an unknown way, in which case the application system can re-execute the instruction, or because it acts on a characteristic (response time with respect to an instruction) in the range of permissible values of this characteristic.

Authenticating integrated circuits, in accordance with the present invention can be done with hardware, software (including firmware), or a combination of both. Moreover, this functionality may be embodied in computer readable media such as 3.5 inch diskettes to be used in programming an information-processing apparatus to perform in accordance with the invention. This functionality may also be embodied in computer readable media such as a transmitted waveform to be used in transmitting the information or functionality.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for the authentication of an integrated circuit in an application system, the integrated circuit receiving instructions from an application program implemented by the system, the method comprising the steps of:
    detecting a scenario of activation in a sequence of normal instructions received by the integrated circuit; and
    temporarily modifying at least one normal response of the integrated circuit to the application system upon the detection of the scenario of activation, the modification causing no malfunction of the integrated circuit in the application system.

2. A method for the authentication of an integrated circuit in an application system, the integrated circuit receiving instructions from an application program implemented by the system, the method comprising the steps of:
    detecting a scenario of activation in a sequence of instructions from the application program to the integrated circuit; and
    modifying at least one response of the integrated circuit to the application system upon the above detection, the modification causing no malfunction of the integrated circuit in the application system,
    wherein the step of modifying comprises varying a response time with respect to an instruction, within a range of permitted values for the response time.

3. A method for the authentication of an integrated circuit in an application system, the integrated circuit receiving instructions from an application program implemented by the system the method comprising the steps of:
    detecting a scenario of activation in a sequence of instructions from the application program to the integrated circuit; and
    modifying at least one response of the integrated circuit to the application system upon the above detection the modification causing no malfunction of the integrated circuit in the application system,
    wherein the step of modifying comprises bringing about a variation in the duration of the build-up of a programming voltage ramp applied to an electrically programmable memory.

4. The method of claim 2, wherein the step of modifying comprises activating a delay circuit on a path of execution of an instruction in the integrated circuit.

5. The method of claim 1, wherein the step of modifying comprises modifying a response relating to the contents of a data element transmitted by the integrated circuit.

6. The method of claim 5, wherein the step of modifying comprises permuting bits of the transmitted data element.

7. The method of claim 5, wherein the step of modifying comprises reversing bits of the transmitted data element.

8. A method for the authentication of an integrated circuit in an application system, the integrated circuit receiving instructions from an application program implemented by the system, the method comprising the steps of:
    detecting a scenario of activation in a sequence of instructions from the application program to the integrated circuit; and
    modifying at least one response of the integrated circuit to the application system upon the above detection, the modification causing no malfunction of the integrated circuit in the application system,
    wherein the step of modifying comprises bringing about a variation in the clock frequency of the integrated circuit, within a range of permitted values.

9. The method of claim 1, wherein the step of detecting a scenario of activation comprises detecting a particular combination of bits of an address or of a data element presented to the circuit.

10. The method of claim 1, wherein the step of detecting a scenario of activation comprises detecting a sequence of a certain number of one or more normal instructions.

11. The method of claim 1, wherein the step of detecting a scenario of activation comprises detecting a certain number of clock pulses.

12. A method for the authentication of an integrated circuit in an application system, the integrated circuit receiving instructions from an application program implemented by the system, the method comprising the steps of:

detecting a scenario of activation in a sequence of normal instructions sent to the integrated circuit;

measuring the response of the integrated circuit to the scenario of activation in order to verify that at least one normal response of the integrated circuit has been modified correctly; and authenticating the integrated circuit if the response is verified as being correctly modified.

13. The method of claim 12, further comprising the step of generating an alarm at the end of a certain period of time after an authentication fault.

14. An authentication system for authenticating an integrated circuit in an application system, wherein the application system implements an application program which sends instructions to the integrated circuit, the authentication system comprising:

means for receiving instructions from the application program;

means for detecting a scenario of activation in a sequence of normal instructions received by the integrated circuit from the application program; and means for temporarily modifying at least one normal response of the integrated circuit to the application system upon detecting the scenario of activation, the modification causing no malfunction of the integrated circuit in the application system.

15. The authentication system of claim 14:

further comprising an electrically programmable memory; and wherein the means for modifying comprises bringing about a variation in the duration of the build-up of a programming voltage ramp applied to the memory.

16. The authentication system of claim 14:

further comprising a delay circuit, the delay circuit being on a path of execution of an instruction in the integrated circuit; and wherein the means for modifying comprises activating the delay circuit.

17. The authentication system of claim 14:

further comprising a means for transmitting a data element from the integrated circuit to the application system; and wherein the means for modifying comprises permuting bits of the transmitted data element.

18. An authentication system for authenticating an integrated circuit in an application system, wherein the application system implements an application program which sends instructions to the integrated circuit, the authentication system comprising:

means for detecting a scenario of activation in a normal sequence of instructions sent to the integrated circuit;

means for measuring the response of the integrated circuit to the scenario of activation in order to verify that at least one normal response of the integrated circuit has been modified correctly; and means for authenticating the integrated circuit if the response is verified as being correctly modified.

19. A computer readable medium containing a program for the authentication of an integrated circuit in an application system, the integrated circuit receiving instructions from an application program implemented by the system, the program containing instructions for performing the steps of:

detecting a scenario of activation in a sequence of normal instructions received by the integrated circuit; and temporarily modifying at least one normal response of the integrated circuit to the application system upon the detection of the scenario of activation, the modification causing no malfunction of the integrated circuit in the application system.

20. A computer readable medium containing a program for the authentication of an integrated circuit in an application system, the integrated circuit receiving instructions from an application program implemented by the system, the program containing instructions for performing the steps of:

detecting a scenario of activation in a sequence of normal instructions sent to the integrated circuit;

measuring the response of the integrated circuit to the scenario of activation in order to verify that at least one normal response of the integrated circuit has been modified correctly; and authenticating the integrated circuit if the response is verified as being correctly modified.

* * * * *